US012779585B2

(12) United States Patent
Jonkers et al.

(10) Patent No.: US 12,779,585 B2
(45) Date of Patent: Nov. 3, 2026

(54) CROSS-JET NOZZLE FOR LASER PROCESSING HEAD

(71) Applicant: II-VI Delaware, Inc., Wilmington, DE (US)

(72) Inventors: Jeroen Jonkers, Berlin (DE); Georg Schmidt, Stahnsdorf (DE); Gunnar Koehler, Potsdam (DE)

(73) Assignee: II-VI Delaware, Inc.

( * ) Notice: Subject to any disclaimer, the term of this patent is extended or adjusted under 35 U.S.C. 154(b) by 646 days.

(21) Appl. No.: 18/159,012

(22) Filed: Jan. 24, 2023

(65) Prior Publication Data

US 2023/0241716 A1 Aug. 3, 2023

Related U.S. Application Data

(60) Provisional application No. 63/305,830, filed on Feb. 2, 2022.

(51) Int. Cl.
*B23K 26/14* (2014.01)
*B23K 26/142* (2014.01)

(52) U.S. Cl.
CPC ........ *B23K 26/1464* (2013.01); *B23K 26/142* (2015.10)

(58) Field of Classification Search
CPC ........ B05B 1/005; B41J 2/1433; B23K 10/00; B29C 49/0023; B29C 49/58
IPC ......... B05B 1/005; B41J 2/1433; B23K 10/00; B29C 49/0023,49/58
See application file for complete search history.

(56) References Cited

U.S. PATENT DOCUMENTS

| | | | | |
|---|---|---|---|---|
| 10,799,983 | B2 * | 10/2020 | Nakamura | B23K 26/36 |
| 2012/0219031 | A1 * | 8/2012 | Tokiwa | B23K 26/142 372/58 |
| 2021/0138585 | A1 * | 5/2021 | Murakami | B23K 26/1462 |

* cited by examiner

*Primary Examiner* — Woody A Lee, Jr.
*Assistant Examiner* — Adam M Eckardt
(74) *Attorney, Agent, or Firm* — TraskBritt

(57) ABSTRACT

A laser material processing head, such as a remote welding head, has an output with a protective optic configured to pass an emitted laser to a working area. The protective optic, such as a cover slide of the output, protects other optics inside the head and is a replaceable, spare part. To prevent at least some debris expelled from the working area from reaching the protective optic, a nozzle is mounted to the head adjacent to the protective optic. The nozzle has an inlet and an outlet for the gas. The outlet has a curvilinear profile configured to fan a cross-jet of the gas in the plane between the protective optic and the working area. The profile of the nozzle reduces the amount of gas needed to divert the debris from the protective optic.

13 Claims, 8 Drawing Sheets

CROSS-JET NOZZLE FOR LASER PROCESSING HEAD

CROSS-REFERENCE TO RELATED APPLICATIONS

The present application claims priority to U.S. Provisional Application No. 63/305,830 filed Feb. 2, 2022. The aforementioned application is hereby incorporated by reference in its entirety.

BACKGROUND

Debris is created during laser material processing. During a welding process, for example, metal spatters are produced that can damage the optics of the laser processing head. For this reason, the laser processing head uses a protective optic or a cover slide as a spare, replaceable part to protect the optics. The service life for this cover slide can be increased by using a cross-jet of air to deflect debris away from the cover slide.

During operation, compressed air from the cross-jet blows away the debris to prevent at least some of the spatter from impinging on the cover slide. Over time, the cover slide will still need to be replaced. Additionally, during operation, a sufficient amount of compressed air must be supplied to protect the cover slide. Producing and delivering compressed air increases operating costs, just as the need to replace cover slides also increases operating costs and creates down-time of the production line.

FIG. 1A illustrates a side view of a laser processing head 20 having a cross-jet module 60 according to the prior art, and FIG. 1B illustrates a front view of the laser processing head 20 in FIG. 1A. The laser processing head 20 includes a housing 30 having appropriate optics and other components to deliver laser energy from a cable coupling 33 into a laser beam LB from an output 38 of the head 20. A cover slide (36) inside the output 38 protects the internal optics of the laser head 20 from spatter and debris produced during operation. A connection 70 to a gas supply on the head 20 can direct gas adjacent the cover slide 36 at the output 38. The laser processing head 20 further includes an electrical connection 40 to a detector.

The cross jet module 60 is supported on a mount 22 to the head 20 and is disposed at a distance beneath the output 38. The laser processing head 20 further includes a pressure gauge 50 that measures the pressure of compressed air, which is blown in the area beneath the output 38. The compressed air tends to divert spatter and debris of the laser process from reaching the cover slide 36 in the output 38 of the head 20. As shown, the cross-jet module 60 has a linear geometry to produce the cross-jet.

DETAILED DESCRIPTION

Figure 2:
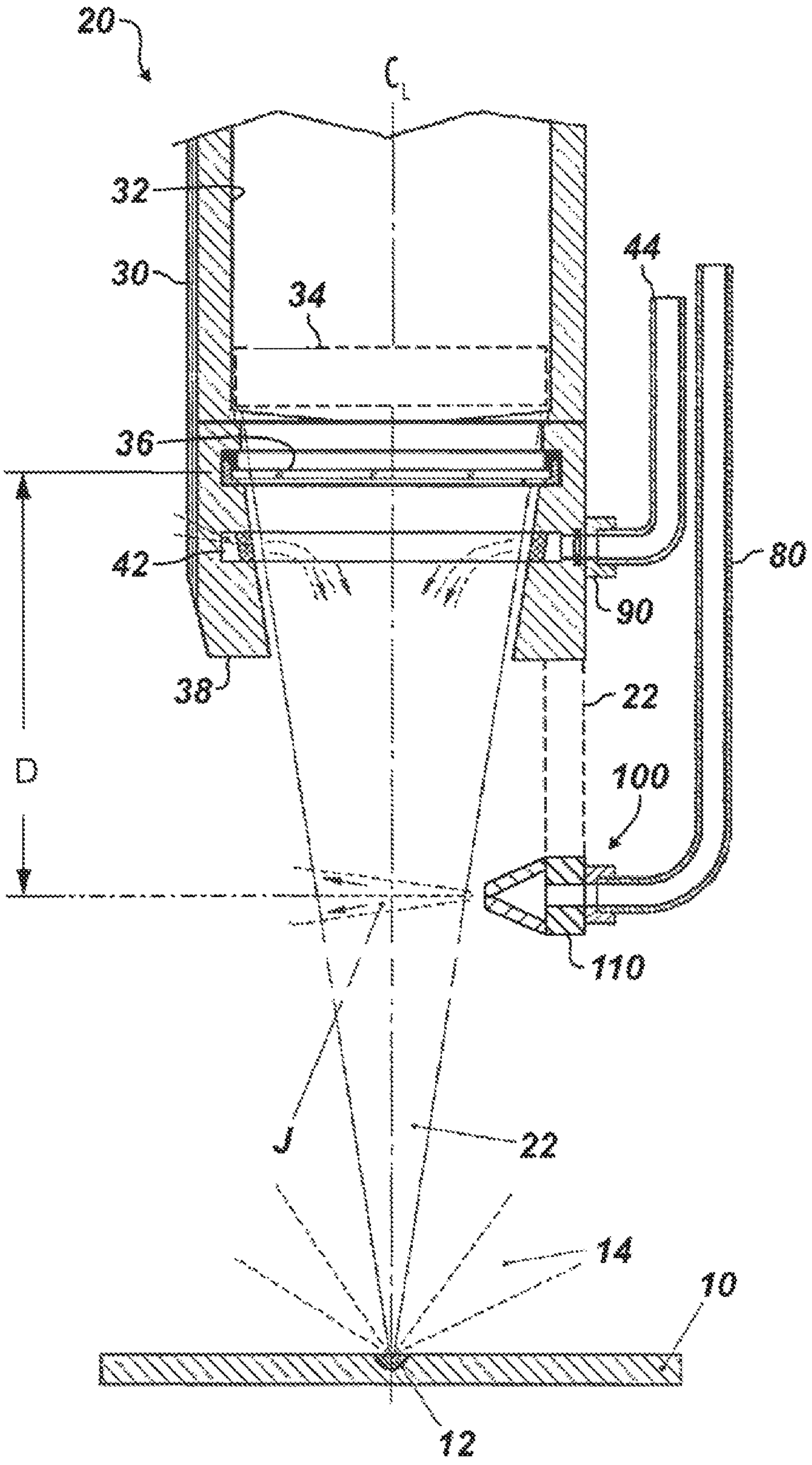
FIG. 2 illustrates a schematic view of a laser processing head having a cross-jet module according to the present disclosure.

FIG. 2 illustrates a schematic view of a laser processing head 20 having a cross-jet module 100 according to the present disclosure. The laser processing head 20 includes a housing 30 having an interior 32 for holding optics and other components to emit a laser beam LB from the housing's outlet 38. For example, optic components 34, such as a focusing lens, galvo-mirrors, and the like, are shown inside the interior 32 of the housing 30. The optic components 34 depend on the type of laser processing head 20.

For example, the optic components 34 in a remote welding head can include galvo-mirrors and focusing lenses to steer the beam. Alternatively, the optic components 34 for a fixed head can include a focusing lens having a fixed position of the focus. As will be appreciated, the head 20 can include several other appropriate components (not shown), such as those used inside a remote welding head or the like.

During operation, debris 14 (e.g., spatter, particles, fumes, and other emissions) is produced at the processing area or weld pool 12 of the laser beam LB on a workpiece 10. A protective optic or cover slide 36 is mounted in the housing 30 between the optic components 34 and the outlet 38 and protects the optic 34 and other internal components of the head 20. As is common, the cover slide 36 is a spare, replaceable part that can be removed and replaced in the housing interior 32 using appropriate features. For example, the cover slide 36 may be held on a cartridge, which can be accessed through an access door on the side of the housing 30.

As is typical, the cover slide 36 is composed of a transparent material, such as an appropriate glass, that allows the laser beam to pass through it, but prevents the passage of debris 14 into the head's housing 30. The cover slide 36 may also have an anti-reflection coating to optimize its transmission for the wavelength range of the laser beam LB.

A gas delivery assembly 90 has a ring jet 42 disposed inside the housing 30 and connected to a supply 44 of gas (e.g., air or the like). The ring jet 42 can blow the gas in a parallel direction to the cover slide 36. This ring jet 42 can additionally help keep the cover slide 36 clear of debris and may tend to cool the cover slide 36.

To further deflect debris 14 that may fly from the processing area 12 in the direction of the optics 34, 36, the cross-jet module 100 has a nozzle 110 connected to a supply line 80. The nozzle 110 can be mounted to the head 20 using a mounting structure 22, which can be adjustable and positioned as needed for an implementation. For example, the distance D of the nozzle 110 relative to the cover slide 36 can be adjusted. Additionally, the angular orientation of the nozzle 110 can be adjusted to blow the cross-jet slightly upwards or downwards. Additionally, the orientation of the cross-jet J can be configured. For example, the mount 22 can be attached such that the cross-jet J is blowing toward one side of the head instead of blowing toward the front as depicted in FIGS. 1A and 1B.

Figure 1A:
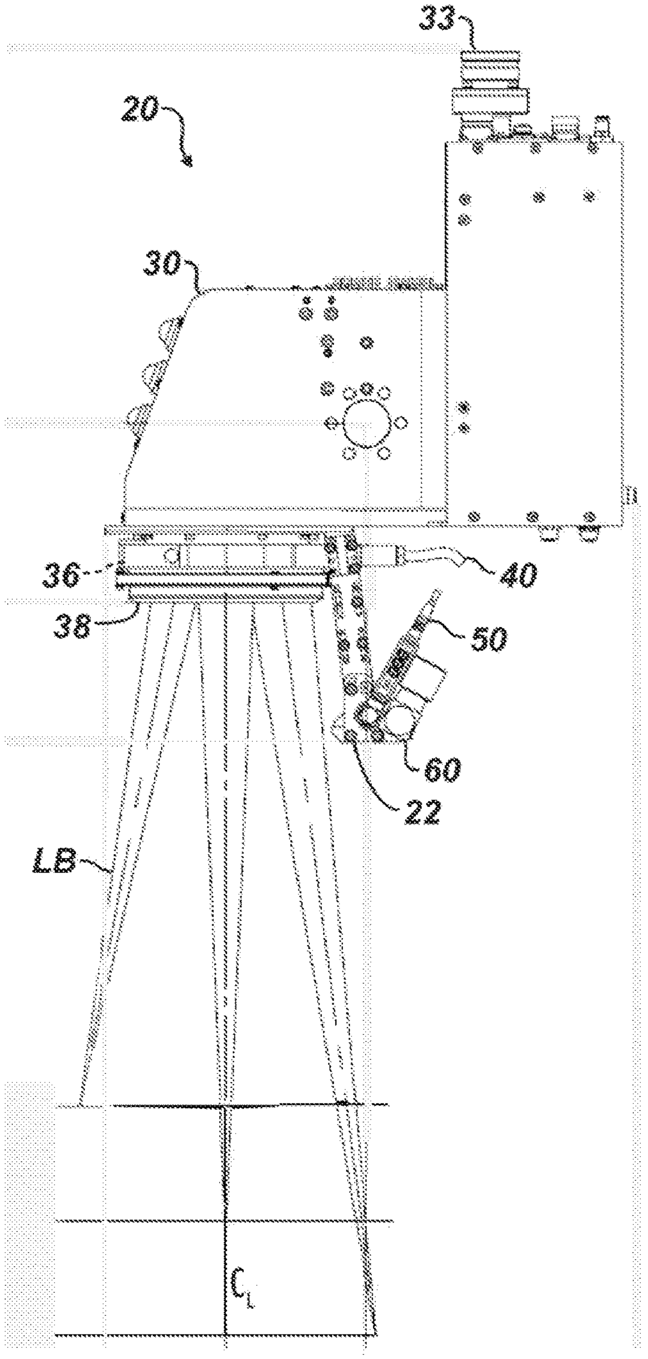
FIG. 1A (Prior Art)
FIG. 1A illustrates a side view of a laser processing head having a cross-jet module according to the prior art.
Figure 1B:
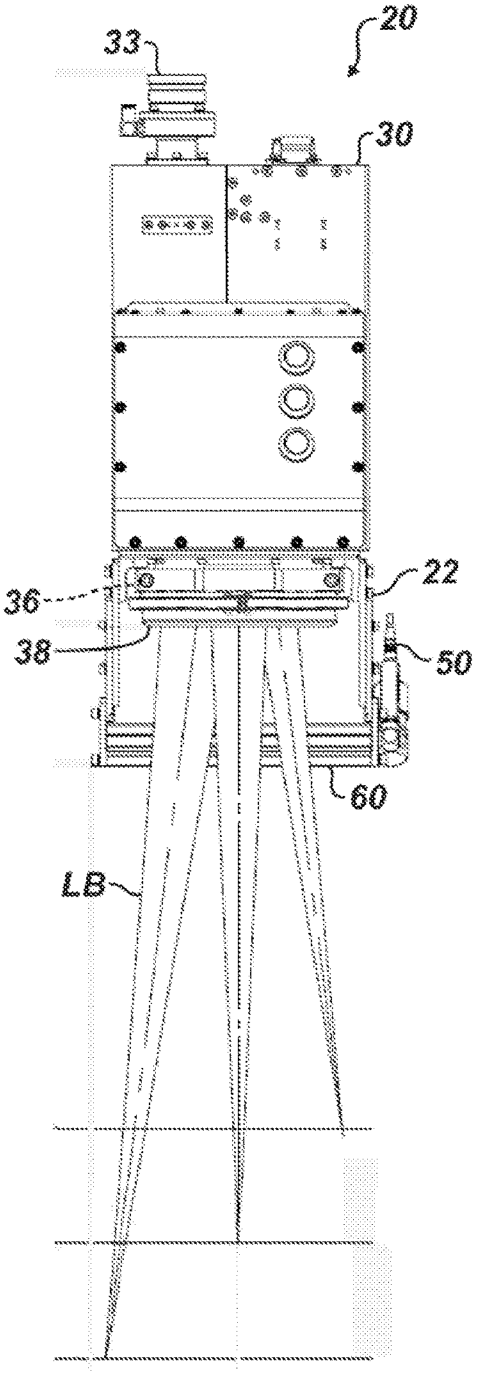
FIG. 1B (Prior Art)
FIG. 1B illustrates a front view of the laser processing head in FIG. 1A.

In a remote welding head, the converging laser beam can come from many different positions inside the outlet 38, as can be seen in FIGS. 1A and 1B. Therefore, the nozzle 110 is mounted further than one cover slide 36 radius away from the center line CL. Such a placement is depicted in FIG. 1A. Due to this placement, the area in the plane of the cross-jet J that needs to be cleaned from debris (area A in FIG. 5A) is slightly larger than the area of the cover slide 36 for a remote head.

In a fixed head, however, there is a fixed converging beam exiting the outlet 38 so that the nozzle 110 can be mounted closer to the optical axis CL than the radius of the cover slide 36. This placement is depicted in FIG. 2. Due to this placement, the area in the plane of the cross-jet J that needs to be cleaned from debris (area A in FIG. 5A) is smaller than the area of the cover slide 36 for a fixed head.

The nozzle 110 delivers a cross-flow or a cross-jet J of compressed gas (e.g., air) in a plane across the space between the outlet 38 and the workpiece 10, e.g., about parallel to cover slide 36. The speed of the cross-jet J can be controlled by varying the pressure of the supply gas. The pressure of the supply gas is measured by the pressure gauge 50 (see FIGS. 1A and 1B). Additionally, the cross-jet module 100 is appropriately positioned. The debris is deflected by the cross-jet J. The deflection of the debris may be measured by a deflection angle α. In general, having the cross-jet J positioned further from the cover slide 36 means that lower deflection angles are required to keep debris 14 away from the cover slide 36. Lower deflection angles require less gas consumption and are therefore preferable. However, the cross-jet J can create strong suction and turbulence in the surrounding air, so the cross-jet J also needs to be properly positioned away from the processing area 12 and relative to the cover slide 36. Moreover, it can be advantageous for the nozzle 110 to be positioned to avoid collisions with parts of the workpiece or to avoid collisions with clamps or other fixtures used to hold the workpiece. Typically, the cross-jet nozzle 110 that generates the cross-jet J is positioned at a distance D about halfway between the processing area 12 and the cover slide 36.

In contrast to the conventional linear geometry of a nozzle for a cross-jet module as seen in the prior art, the nozzle 110 of the present disclosure has a profile with a curvilinear geometry. In particular, FIGS. 3A-3D illustrate a perspective view, a front view, a back view, and a cross-sectional view of a nozzle 110 for the disclosed cross-jet module.

The nozzle 110 has top and bottom lips or surface 111*a*, 111*b* that converge from an input end 112*a* to an output end 112*b*. Sides 118*a*, 111*b* on the lips 111*a*, 111*b* enclose a converging chamber 115 of the nozzle 110. An inlet 114 on the input end 112*a* connects to a supply line, adapter, or the like as appropriate to receive compressed gas or air. An outlet 116 in the form of a slit at the output end 112*b* of the nozzle 110 delivers the cross-jet of the present disclosure. The cross section of outlet 116 may have a shape similar to a de Laval nozzle.

The nozzle 110 can be fabricated as appropriate by machining, molding, and welding of the various components together. For example, different machined parts can be assembled together and can have seals at their connections. The components depicted in FIGS. 3A-3D are merely presented as an example.

Figure 3A:
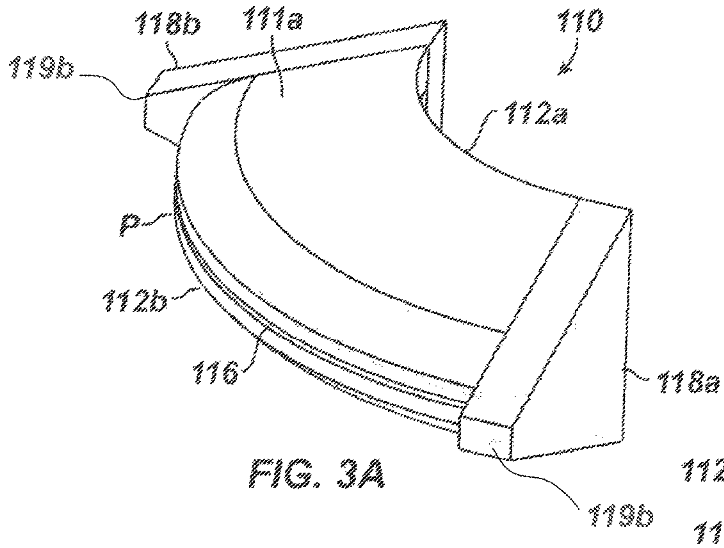
FIG. 3A illustrates a perspective view of one embodiment of a nozzle for the disclosed cross-jet module.
Figure 3D:
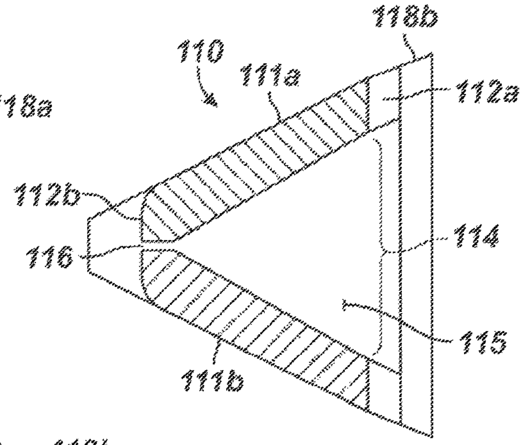
FIG. 3D illustrates a cross-sectional view of the nozzle of FIG. 3A.
Figure 3B:
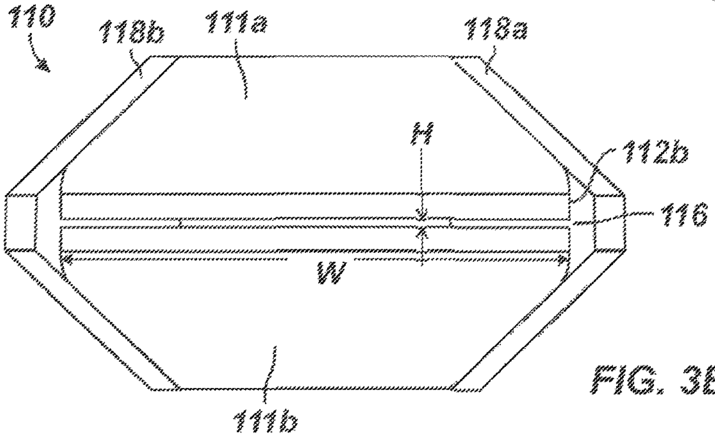
FIG. 3B illustrates a front view of the nozzle of FIG. 3A.
Figure 3C:
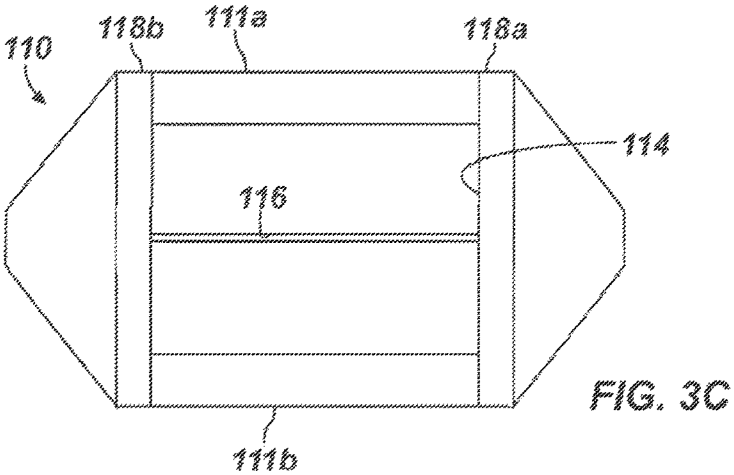
FIG. 3C illustrates a back view of the nozzle of FIG. 3A.

The geometry of the nozzle 110 is of particular interest with respect to the teachings of the present disclosure. Namely, the outlet 112*b* of the nozzle has a curvilinear profile P as noted previously. The slit 116 extends along the curvilinear profile P and has a thin height H compared to the inlet 114 so that the chamber 115 reduces in a triangular cross-section. The slit 116 has a width Won the output end 112*b*, which extends along the curvilinear profile P of a circumferential segment. If desired, the sides 118*a*, 118*b* can extend out a distance from the output end 112*b*, for example shown as foil 119*b*. Only a short foil 119*b* is depicted in FIGS. 3A and 3D for the side 118*b*, but the foil(s) can extend a greater length. Further details are provided below.

Figure 4A:
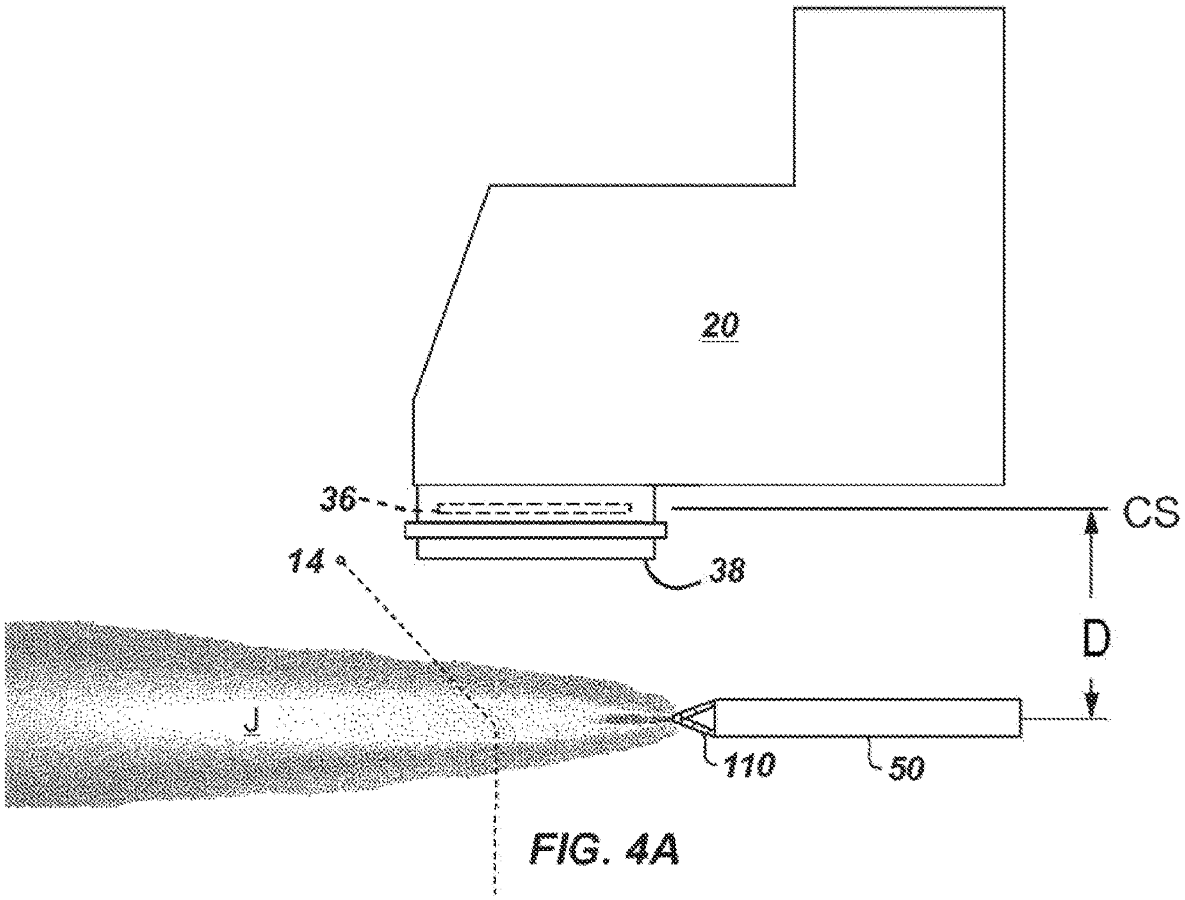
FIG. 4A illustrates a side view of the disclosed nozzle during use.
Figure 4B:
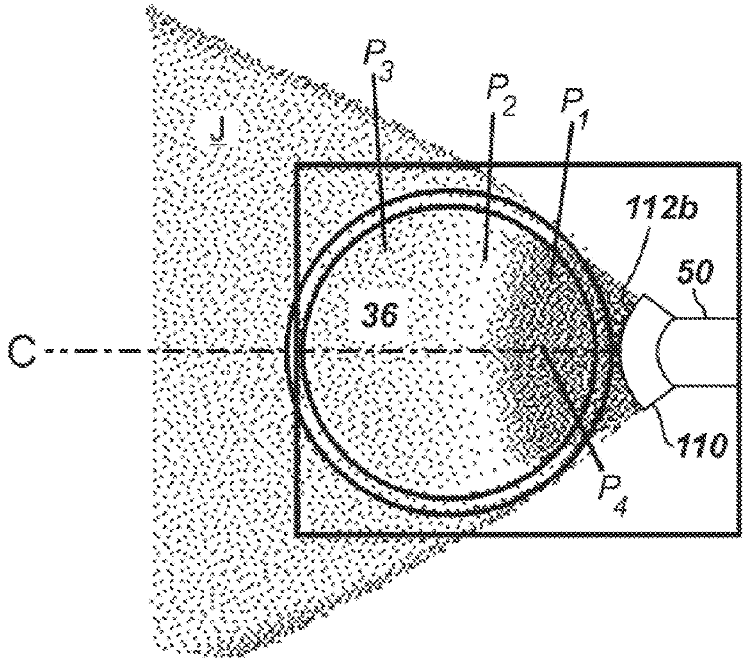
FIG. 4B illustrates a plan view of the disclosed nozzle during use.

FIG. 4A illustrates a side view of the disclosed nozzle 110 during use to produce a cross-jet J, and FIG. 4B illustrates a plan view of the disclosed nozzle 110 during use to produce the cross-jet J. As shown, the cross-jet J is emitted beneath the cover slide 36 of the processing head 20 at an appropriate distance D, and the cross-jet J diverges or fans out in a fan shape from the output end 112*b* of the nozzle 110 under the circumference of the output 38, which has the cover slide 36. FIG. 4B schematically shows the profile of the nozzle 110 and cover slide 36 merely for illustrative purposes. As schematically shown, the deflection power of the cross-jet J diverging from the nozzle 110 generally decreases with the distance from the nozzle's output 112*b* and is labelled at points $P_1$, $P_2$, $P_3$ in the depiction. This behavior may be specific for the disclosed nozzle 110. The deflection power of a linear nozzle (e.g., 60 in FIGS. 1A and 1B) used in the prior art may stay pretty constant with distance from the nozzle (60).

During the laser processing operation, debris 14 is created that flies toward the cover slide 36. One trajectory of an example piece of debris is schematically depicted in FIG. 4A. The cross-jet J is used to deflect the debris as it flies upward so the area of the cover slide 36 can be protected from the debris.

The debris traveling from the processing area 12 (see FIG. 2) encounters the cross-jet J. At the cross-jet J, the debris is accelerated in the direction of the gas flow of the cross-jet J. The velocity components in the other two directions are not significantly affected by the cross-jet J. After the cross-jet J, the debris tends to travel further toward a plane CS defined by the cover slide 36. Once reaching further upward, the debris has preferably been moved an additional distance in the plane CS of the cover slide 36 due to its interaction with the cross-jet J. The goal is to achieve a deflection of the debris sufficient to miss the area of the cover slide 36 to be protected by the cross-jet J while minimizing the amount of gas that needs to be supplied (i.e., reducing the gas consumption).

After the debris traveling from the processing area 12 encounters the cross jet J, for example, the debris travels over the vertical distance D before the debris can reach the plane CS defined by the cover slide 36. In general, debris close to the jet's outlet 112*b* needs to be deflected over the diameter of the cover slide 36 after having travelled over vertical distance D. Of course, the required deflection at point (P1) is greater than the required deflection at point (P2), which is greater than the required deflection at point (P3). The required deflection at point P1 is less than the required deflection at point P4. Thus, for debris crossing the cross-jet J at a further point, such as at point P3, opposite to the outlet 112*b* of the nozzle 110 only a small deflection would be sufficient to miss the cover slide 36. Moreover, the required deflection distance for debris crossing at a peripheral point, such as at point P1, away from the horizontal line of symmetry C in FIG. 4B can be reduced by the fan-like cross-jet J as is disclosed herein. By comparison, the required deflection distance for debris crossing at a central point, such as at point P4, on the horizontal line of symmetry C in FIG. 4B would be greater.

As noted, the cross-jet J is placed at a distance D from the plane CS of the cover slide 36. The velocity of the cross-jet required to deflect debris decreases with this distance D. However, the larger the distance D, the closer the cross-jet J is to the workpiece, which may result in several practical problems. Therefore, as noted, this distance D is typically about half the gap between the cover slide 36 and the workpiece 10, although it may vary. As will be appreciated, the surface of a workpiece 10 may be uneven. For a remote welding head, the focus of the laser beam from the head can be moved up and down rapidly to enable welding of the uneven workpiece while the head and cross jet are not moved.

In the end, the place of origin for the debris is typically a fixed point in space or is limited to a certain volume in space for welding. Additionally, the distance D of the cross-jet J is defined by several considerations, as is explained above. Moreover, the debris encountered during laser processing can have a range of characteristics, including radius, specific density, velocity, the direction of flight, and point of origin. Each of these characteristics depends on the welding process, materials being welded, etc., so they can be assumed given for the problem to minimize the gas consumption. Overall, keeping debris from the required area A during the laser processing is governed by the characteristics of the cross-jet J and the shape of the nozzle 110 that is used to produce the cross-jet J. In particular, the shape (curvature, length of exit slit 116, height of exit slit 116, etc.) of the nozzle 110 and the amount of gas delivered in the cross-jet J determine the characteristics of the cross-jet J that interacts with the debris. The shape (curvature, length, height, etc.) of the nozzle 110 can be chosen to reduce the gas consumption.

The cross jet nozzle 110 according to the present disclosure is configured to reduce the amount of compressed gas or air that needs to be delivered to produce the cross-jet J sufficient to divert debris. The reduced gas consumption is further configured to protect the cover slide 36 to a sufficient degree that undue replacement of the cover slide 36 is not required. To that end, the cross-jet nozzle 110 reduces the gas consumption while preferably maintaining or even improving the same deflection performance as existing solutions. The deflection performance is measured by the deflection angle α. The deflection angle α required for a sufficient deflection performance is lower than existing solutions due to the divergent flow pattern of the gas flowing out of the cross-jet nozzle 110.

The laser processing head 20 of the present disclosure can be a remote welding head, which has a large cover slide 36 because internal optics and components of the head 20 can direct the laser beam LB in different directions without the need to translate the head 20 with a robot or to displace the workpiece with a mechanized work surface. Normally, the head 20 used in remote welding is combined with a robot or a translation stage because the workpiece is larger than the working volume (or area) of the remote head 20. Most welds are relatively short so the internal optic components 34 (e.g., galvo-mirrors) of the remote head 20 are used to jump the laser beam LB from one weld to the next much faster than can be accomplished by the robot, for example. Expanded to welding-on-the-fly for higher throughput, the head 20 can be moved continuously with a robot, and the movement of the galvo-mirrors inside the head 20 can be exactly synchronized with that of the robot to produce the welds at exactly the required position.

The cover slide 36, in one example, can be as large as 200 mm in diameter, and the working area over which the laser beam can be directed can be about 300 mm by 200 mm in one example. Other configurations are possible depending on the implementation. For such a remote welding head 20, the cross-jet nozzle 110 with the curvilinear output 112*b* can deliver the same deflection performance to deflect debris from the cover slide 36 while using roughly half the gas consumption compared to the conventional linear nozzle arrangement. The same principle for the disclosed cross-jet nozzle 110 used for a remote welding head with the larger cover slide 36 can also be used on a fixed welding head. In such an arrangement, however, the curvilinear profile P and the size of the nozzle 110 may be adjusted given that the origin of the debris will have a constant position with respect to the fixed welding head. Also, the nozzle 110 can be positioned closer to the central axis CL.

Figure 5A:
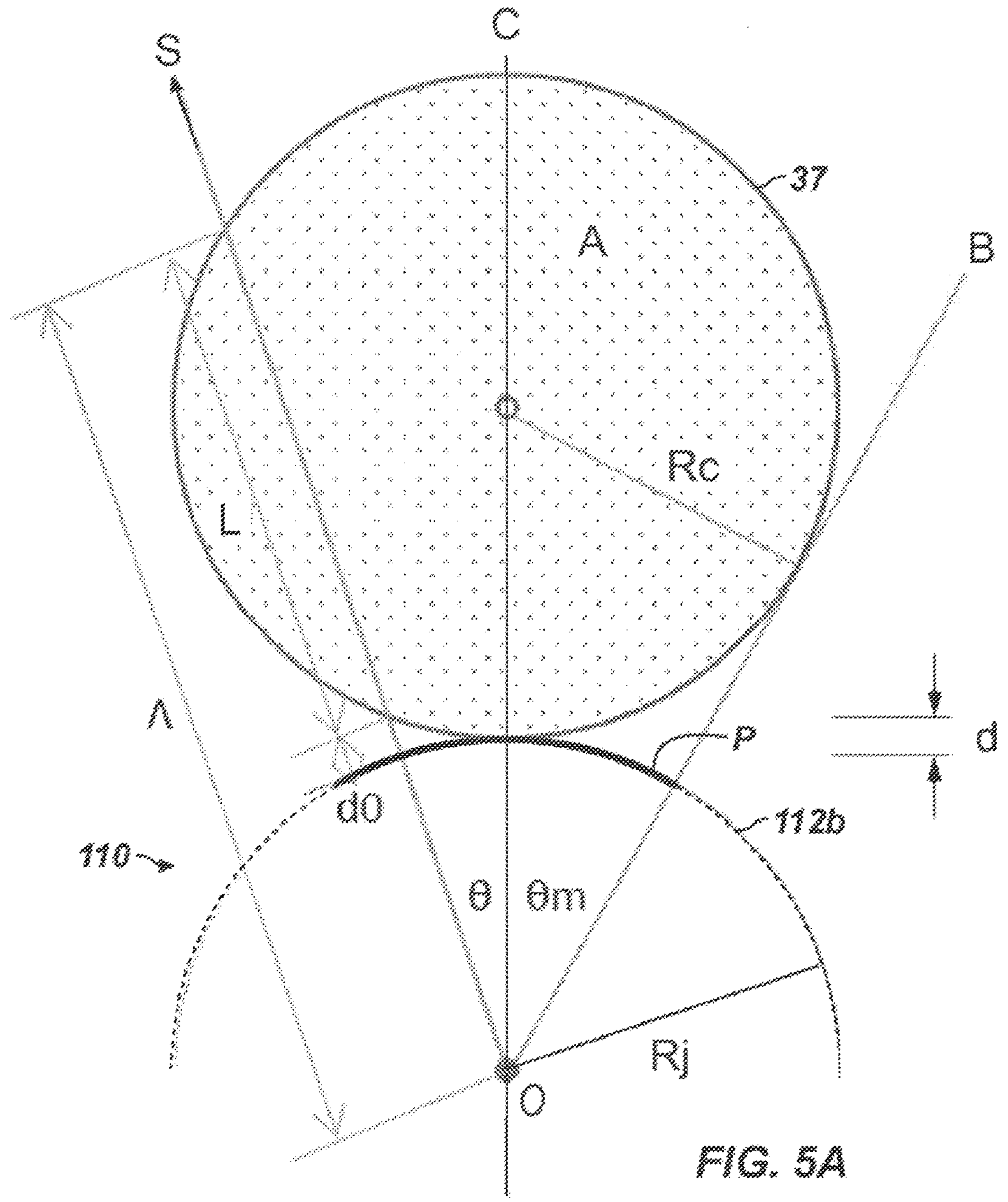
FIG. 5A illustrates a schematic plan view of a profile of the disclosed nozzle.

FIG. 5A illustrates a schematic plan view for the curvilinear profile P of the output end 112*b* of the disclosed nozzle 110 relative to the circumference 37 of area A that is desired to be cleared of debris. As will be appreciated, the nozzle 110 and the cover slide are not in the same plane and are separated by the vertical distance D noted previously. For simplicity, discussion of the geometric positions of the components relative to one another can refer to projections in in the plane of cross-jet J. In the geometry depicted in FIG. 5A, the circumference 37 of the area A should be cleared of debris that is depicted as a circle with radius Rc. This represents the area A from which debris should be deflected. The curvilinear profile P of the output end 112*b* of the nozzle 110 is depicted as a segment with radius Rj. An example streamline S of the cross-jet produced by the nozzle 110 is shown extending from the output end 112*b* of the nozzle 110, virtually originating from a central origin point O. Any debris encountered by this streamline S needs to be deflected up to a maximum distance L so the debris can be deflected from the area A of the cover slide 36. In other words, at the point where the streamline S enters area A, the distance L would represent the deflection required of the debris along the streamline's direction so the debris will miss the cover slide 36 as it flies further upward from the cross-jet. Further down the streamline S, a deflection distance less than L is needed. The fan-like cross-jet also produces less deflection at distances further away. Following from FIG. 4B, for example, the deflection at point P1 would be greater than the deflection at point P2, which would be greater than the deflection at point P3. In more detail, the required deflection decreases linearly with distance along the streamline S, whereas the delivered deflection from the cross-jet J may decrease inversely proportional with the distance to the virtual origin O of the streamlines S. To deliver the minimally required deflection for all debris, more gas per unit of width (angular extent) along the exit slit 116 is needed. However, the overall width of exit slit 116 reduces even more so that the gas consumption (i.e., gas consumption=gas per unit width×width of the exit slit) is ultimately reduced. The gas consumption (for given debris) decreases monotonically with decreasing Rj because the width of the exit slit 116 decreases faster than the required gas per unit of width increases. In the case where the curvature Rj is constant along the slit 116, this holds true for the curvature Rj being roughly half the radius of the cover slide 36. The streamline S and the centerline C define an angle θ between each other. The angle θ may reach a maximum angular extent θm. The maximum angular extent Om of the output end 112*b* does not need to exceed the boundary line B tangent to the circumference of area A, although some additional angular extent can be provided if desired. Either way, the slit (116) along the profile P of the output end 112*b* can define a circumferential segment. This reduces the gas required because the width of the slit 116 is shorter than used for the linear configuration.

As noted, the gas required can be reduced by choosing a radius Rj of curvature for the crossjet's output end 112*b*. A smaller radius Rj of curvature of the nozzle 110 produces more diverging/fanning of the cross-jet. This can reduce the conventional gas consumption by about 40% compared to the linear state of the art cross jet without sacrificing the life of the cover slide 36. In general, the radius Rj of curvature of the nozzle 110 can be less than the radius of the cover slide 36, which is related geometrically to the radius Rc of the area to be cleared of debris. For example, the radius Rj for the nozzle 110 can be about half the radius of the cover slide 36. This may be the optimum arrangement for a remote welding head. Yet, the nozzle 110 having its radius Rj larger than the cover slide's radius can be used and can still reduce gas consumption. For example, the nozzle's radius Rj can be smaller than four times the radius of the cover slide 36. The arrangement for a fixed welding head can be different. Therefore, without limitation, the radius Rj for the nozzle 110 can be less than, equal to, or greater than the radius of the cover slide 36 and can be configured for an implementation, while still reducing gas consumption.

The radius Rj of curvature for the profile P can be constant. All the same, the streamlines S for the cross-jet offset from the centerline C (i.e., at angles of $|\theta|>0$) may overperform the deflection of debris when the radius Rj of curvature is constant. For example, the cross-jet nozzle 110 delivers sufficient velocity for the centerline C of the cross-jet, where the largest deflection L is required (e.g., the deflection L can be roughly the diameter of the cover slide 36 at centerline C). At both outer edges of the nozzle's profile P (e.g., tangent B), the required deflection L is significantly lower so the gas flow can be reduced. This could be achieved by reducing the local gas flow by varying the height (II) of the exit slit (116) of the nozzle 110 so that the height of the slit (116) is smaller toward the opposing edges and is relatively large in the middle or center of the slit (116). Therefore, the gas consumption can be further reduced by decreasing the height (II) of the outlet slit (116) in the nozzle 110 with the increasing angle θ from the centerline C.

Additionally, or in the alternative, the gas consumption can be further reduced by decreasing the radius Rj of curvature of the output end 112*b* with increasing angle θ from the centerline C. In particular, the gas consumption scales linearly with the width of the slit 116, which is a function of the radius Rj of curvature and the maximum angular extent θm. The radius Rj of curvature of the nozzle 110 can be reduced for larger angles θ from the centerline C. In turn, the width of slit 116 can be further reduced by decreasing the radius Rj with increasing angle θ. A smaller radius Rj results in a more divergent jet J and hence produces a faster decrease of the "deflection power" for increasing distance from the nozzle 110. For larger angles θ, the decrease in deflection power is still acceptable because the required deflection is also less, even if the "dead" distance d0 between nozzle end 112*b* and the start of the zone A is taken into account. In this way, the gas consumption can be reduced to about 40% or 45% of the conventional gas consumption.

The required deflection L can be further reduced by further reducing the radius Rj of curvilinear profile P of the cross-jet outlet 112*b* so that it produces more divergent streamlines S. This effect compensates the faster decrease in deflection power of the cross-jet J mentioned above. In other words, the reduced radius Rj increases the angle θ so that the debris is pushed more to the outside and hence less deflection is needed. In this way, debris at both edges of the cross-jet J can be pushed even more outwards resulting in a shorter required deflection distance L. The divergent flow pattern is produced by the nozzle 110 with a shorter exit slit 116, which results in a lower gas consumption.

In FIG. 5A, the profile P of the cross-jet end 112*b* has a constant radius of curvature. As explained above and repeated here, the distance A along the streamline S from the center of the cross-jet nozzle 110 to the end of the cover slide's area A decreases with increasing angle θ from the centerline C of symmetry. The cross-jet with this constant radius Rj of curvature overperforms as the deflection power decreases exactly the same along every stream-line S, but for large angles θ, less deflection power is needed. This over-performance can be used to further optimize the nozzle 110 by (i) decreasing the height H of the slit 116 as a function of increasing angle θ; and/or (ii) decreasing the radius of curvature of the profile P as a function of increasing angle θ.

Figure 5B:
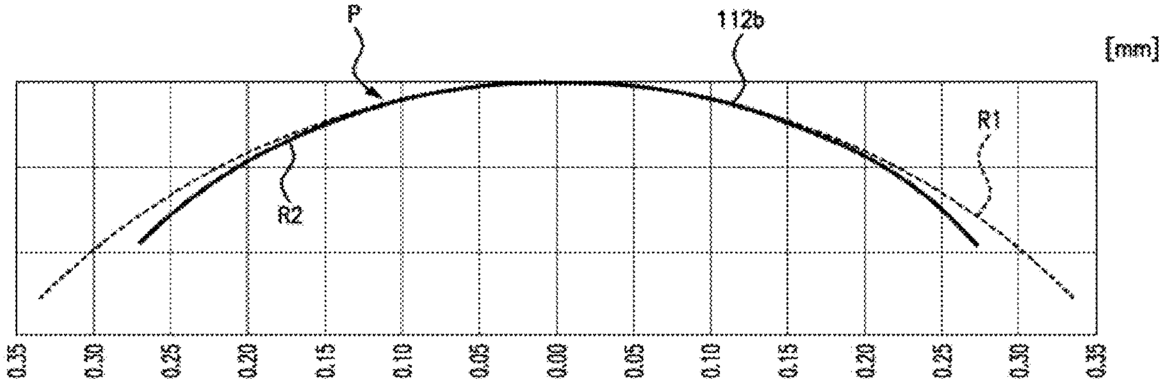
FIG. 5B illustrates a schematic plan view of two example profiles for the disclosed nozzle.

For example, FIG. 5B illustrates a schematic plan view of an example profile P for the output end 112*b* for the disclosed nozzle. A constant radius R1 of curvature is depicted relative to a variable radius R2 of curvature for the profile P of the nozzle's end 112*b*. The curvatures R1, R2 at the axis of symmetry are equal. For the largest angles θ, the radius of curvature of curve R2 reduces to about a tenth of the constant radius R1. The width (angular extent) of the profile P for the variable radius R2 is about 20% shorter, which results in a further reduction of the gas consumption.

Several variables can be adjusted according to the implementation to reduce the gas consumption while suitably preventing debris from reaching the cover slide. The height H of the slit 116, the width W of the slit 116, the radius of curvature of the profile P, whether the radius is constant or varies, the horizontal distance d and vertical distance D of the nozzle's output end 112*b* from the cover slide 36, and other variables noted herein. As an example, the exit slit 116 may have a height H that is relatively small, being about 0.2 mm according to one embodiment. In another example, the nozzle's output end 112*b* can be positioned back so the distance d>0 from the area A.

During operation, the cross-jet J may produce eddies in the air at the sides of the nozzle 110. The eddies may disrupt the trajectories of debris. The disrupted debris can be brought into the space between the jet J and the cover slide 36 and may reach the cover slide 36. One way to avoid debris from these areas, the working area of the laser head 20 can be reduced so the laser beam tends to not produce debris from the areas at the sides of the nozzle 100. In another arrangement, foils or barriers can be used.

Figure 6A:
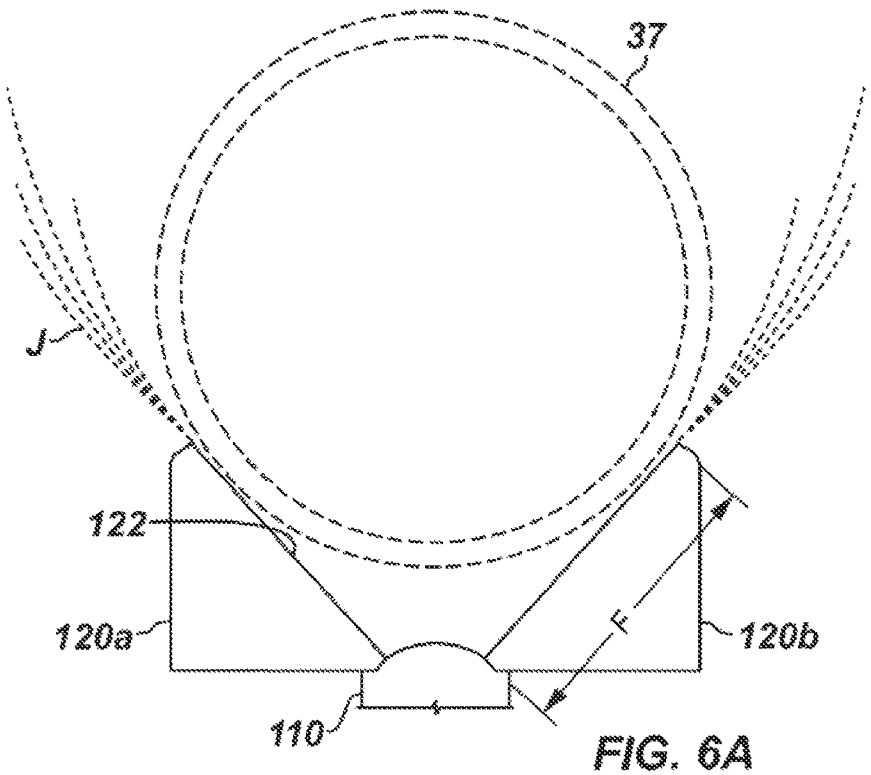
FIG. 6A illustrates a schematic plan view of the disclosed nozzle having a first set of foils.
Figure 6B:
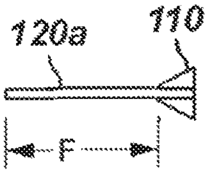
FIG. 6B illustrates a schematic side view of the disclosed nozzle having the first set of foils.

For example, FIGS. 6A and 6B illustrate schematic plan and side views of the disclosed nozzle 110 having a set of foils 120*a*, 120*b*. The foils 120*a*, 120*b* can be placed in these side areas of the nozzle 110 to prevent the formation of the eddies and to act as a barrier to the debris passing in these side areas.

As shown here, the foils 120*a*, 120*b* can be metal plates disposed horizontally in the plane of the cross-jet J and positioned on both sides of the nozzle 110. The inner edges 122 of the foils 120*a*, 120*b* can extend approximately tangential to the circumference 37 of area A. (As noted further above, for the nozzle 110 used on a remote head, this projected circumference is at least as great as or greater than the circumference of the cover slide 36 because a converging laser beam from the remote head can go to many different positions. For the nozzle 110 used on a fixed head, however, the projected circumference is smaller than the circumference of the cover slide 36 due to the converging (and position-wise stable) beam.) The extent F that the foils 120*a*, 120*b* extend can be configured as desired depending on the working area of the welding head, the characteristics of the debris produced during welding, and the expected movement of the welding head during operation.

Figure 7A:
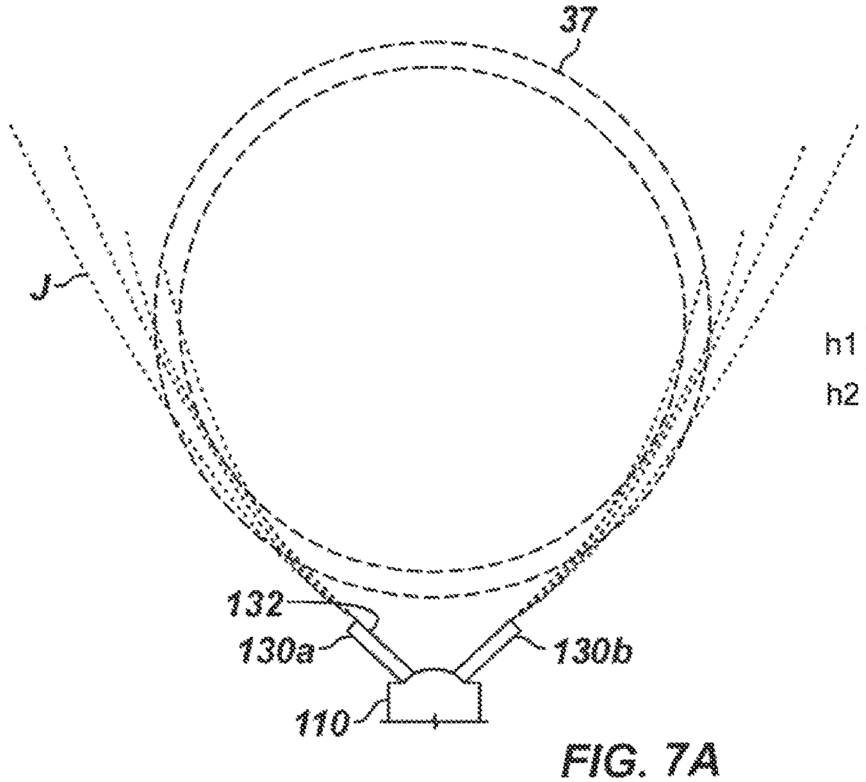
FIG. 7A illustrates a schematic plan view of the disclosed nozzle having a second set of foils.
Figure 7B:
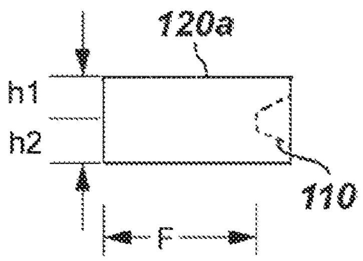
FIG. 7B illustrates a schematic side view of the disclosed nozzle having the second set of foils.

FIGS. 7A and 7B illustrate schematic plan and side views of the disclosed nozzle 110 having another set of foils 130*a*, 130*b*. These foils 130*a*, 130*b* can be metal plates disposed vertically in the plane of the cross-jet J and positioned on both sides of the nozzle 110. The inner surfaces 132 of the foils 130*a*, 130*b* can extend approximately tangential to the circumference 37 of area A. The extent F that the foils 130*a*, 130*b* extend can be configured as desired depending on the working area of the laser head, the characteristics of the debris produced during welding, and the expected movement of the laser head during operation. Additionally, the height h1, h2 of the foils 130*a*, 130*b* either above or below the plane of the nozzle 110 can be configured as desired. To avoid interference with the working area, surrounding clamps, and the like, the lower vertical height h2 of the foils 130*a*, 130*b* preferably does not extend too far below the plane of the cross-jet J, but other configurations can be used.

Figure 8:
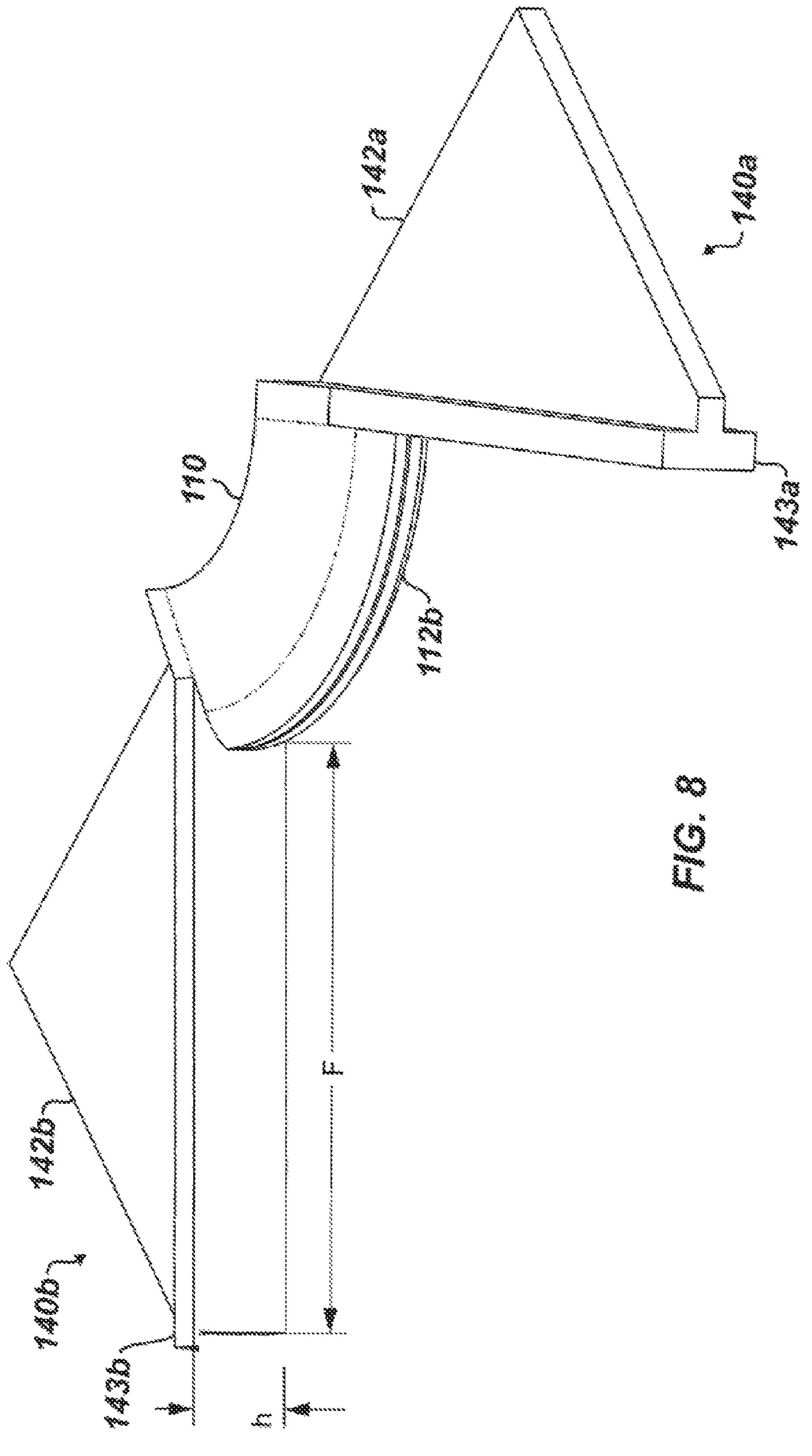
FIG. 8 illustrates a perspective view of the disclosed nozzle having a third set of foils.

FIG. 8 illustrates a perspective view of the disclosed nozzle 110 having another set of foils 140*a*, 140*b*. These foils 140*a*, 140*b* include horizontal foil sections 142*a*, 142*b* on both sides of the nozzle 110 similar to those discussed above, and the foils 140*a*, 140*b* include vertical foil sections 143*a*, 143*b* disposed on the inner edges of the horizontal foil sections 142*a*, 142*b*. Again, the extent F that the foils 140*a*, 140*b* extend can be configured as desired depending on the working area of the laser head, the characteristics of the debris produced during welding, and the expected movement of the laser head during operation. Likewise, the height h of the foil sections 143*a*, 143*b* either above or below the plane of the nozzle 110 can be configured as desired.

Figure 9:
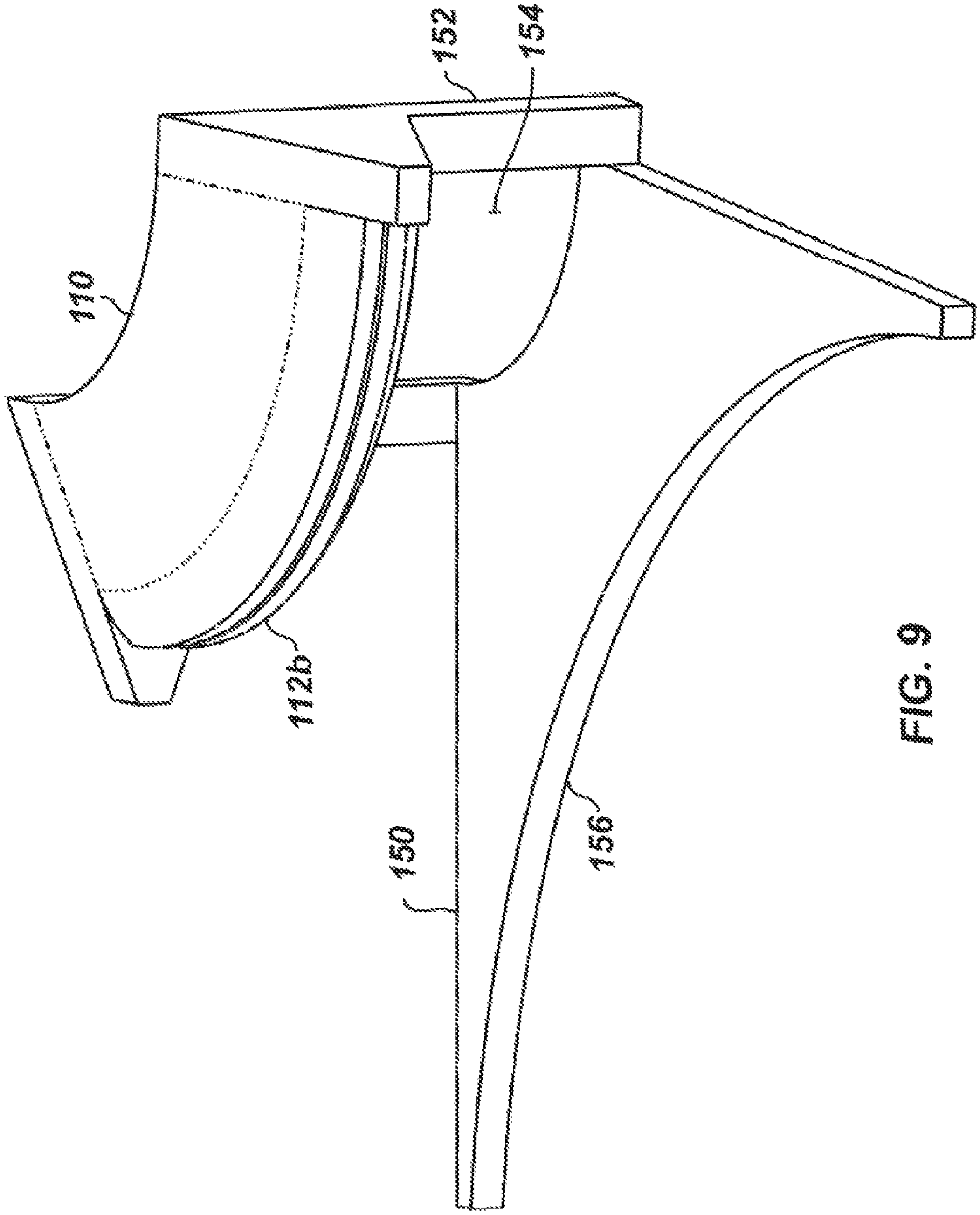
FIG. 9 illustrates a perspective view of the disclosed nozzle having another type of foil.

FIG. 9 illustrates a perspective view of the disclosed nozzle 110 having another type of foil 150. Here, the foil 150 is positioned a distance below the output end 112*b* of the nozzle 110. The foil 150 has the form of a planar barrier with a curved edge 156 to accommodate passage of the laser beam. The foil 150 is held by two thin legs 152 extending from the bottom of the nozzle 110 so that there is a large opening 154 between the foil 150 and the nozzle 110. This opening 154 is useful to allow the cross-jet to suck in air from the surroundings. The foil 150 will cover the "dead" distance or zone between the output end 112*b* of the nozzle 110 and the area A, which was noted previously. The foil 150 can block passage of debris through this zone, which can have added benefits. Features of this foil 150 can be combined with any of the other foils disclosed herein, e.g., the foil 150 can be made wider, so that the foil 150 includes the function of the horizontal foils 120*a*, 120*b* from FIGS. 6A and 6B as well. The dimensions of the foil 150 and its depth compared to the output end 112*b* of the nozzle 110 can be configured to meet the needs of an implementation.

The foregoing description of preferred and other embodiments is not intended to limit or restrict the scope or applicability of the inventive concepts conceived. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

What is claimed as new and desired to be protected by Letters Patent of the United States is:

1. A system for material processing, the system comprising:

a laser processing head configured to emit a laser beam toward a working area, the laser processing head comprising:

an output from which the laser beam is configured to be emitted; and a cover slide that covers the output and from which the laser beam is configured to pass through, the cover slide having a cover slide radius of curvature; and a nozzle comprising an outlet with a curvilinear profile having an outlet radius of curvature, the outlet being configured to direct a cross-jet of a gas between the cover slide and the working area, wherein the outlet radius of curvature is smaller than 4 times the cover slide radius of curvature.

2. The system of claim 1, wherein the outlet radius of curvature is less than the cover slide radius of curvature.

3. The system of claim 1, wherein the outlet radius of curvature is half the cover slide radius of curvature.

4. The system of claim 1, wherein the outlet radius of curvature is constant along the curvilinear profile.

5. The system of claim 1, wherein:

the outlet radius of curvature is varied, and edges of the outlet radius of curvature are smaller than a center of the outlet radius of curvature.

6. The system of claim 1, wherein:

the outlet comprises a slit that is configured to pass the gas through, the slit having: a width along the curvilinear profile, and a height perpendicular to the width, and the height of the slit is constant along the width.

7. The system of claim 1, wherein:

the outlet comprises a slit that is configured to pass the gas through, the slit having: a width along the curvilinear profile, and a height perpendicular to the width, and the height of the slit is narrower at edges along the width of the slit than at a center of the slit.

8. The system of claim 1, wherein:

the system further comprises a foil between the nozzle and the working area, and the foil extends partially beyond the outlet of the nozzle.

9. The system of claim 1, wherein:

the nozzle further comprises foils at opposing sides of the nozzle and extending at least partially beyond the outlet, the foils comprise plates extending at least partially in a direction along which the nozzle is configured to direct the gas, and each of the plates comprising an inner edge approximately tangential to a circumference of the cover slide.

10. The system of claim 1, wherein:

the nozzle further comprises foils at opposing sides of the nozzle and extending at least partially beyond the outlet, the foils comprise plates extending at least partially in a direction along which the nozzle is configured to direct the gas, and each of the plates comprising an inner side approximately tangential to a circumference of the cover slide.

11. The system of claim 1, wherein:

the system further comprises a supply line in fluid communication with an inlet of the nozzle, and the supply line is configured to communicate the gas to the nozzle.

12. The system of claim 1, further comprising a mount connected to the nozzle and to the laser processing head.

13. The system of claim 1, wherein the outlet is configured to direct the cross-jet of the gas along a direction parallel to the cover slide.

* * * * *